(12) United States Patent
Kreiling et al.

(10) Patent No.: US 11,287,811 B2
(45) Date of Patent: Mar. 29, 2022

(54) GATEWAY INTERFACE FOR A WORK MACHINE

(71) Applicant: Deere & Company, Moline, IL (US)

(72) Inventors: Jeffery R. Kreiling, Dubuque, IA (US); David J. Rulseh, Dickeyville, WI (US); Christopher R. Matthews, Lauderdale by the Sea, FL (US)

(73) Assignee: Deere & Company, Moline, IL (US)

( * ) Notice: Subject to any disclaimer, the term of this patent is extended or adjusted under 35 U.S.C. 154(b) by 231 days.

(21) Appl. No.: 15/985,088

(22) Filed: May 21, 2018

(65) Prior Publication Data
US 2019/0354098 A1  Nov. 21, 2019

(51) Int. Cl.
| | |
|---|---|
| *G05D 1/00* | (2006.01) |
| *G05D 1/02* | (2020.01) |
| *E02F 9/20* | (2006.01) |
| *H04L 12/40* | (2006.01) |
| *A01G 23/00* | (2006.01) |

(52) U.S. Cl.
CPC .......... *G05D 1/0022* (2013.01); *E02F 9/205* (2013.01); *G05D 1/0276* (2013.01); *A01G 23/006* (2013.01); *G05D 2201/0201* (2013.01); *G05D 2201/0202* (2013.01); *H04L 2012/40215* (2013.01)

(58) Field of Classification Search
CPC ..... G05D 1/0022; G05D 1/0276; E02F 9/205; A01G 23/006; H04L 2012/40215
USPC ........................................................... 701/2
See application file for complete search history.

(56) References Cited

U.S. PATENT DOCUMENTS

| | | | |
|---|---|---|---|
| 6,231,030 B1 | 5/2001 | Smith | |
| 7,941,253 B1* | 5/2011 | Brant | B63H 25/42 701/21 |
| 8,386,090 B1* | 2/2013 | Hobbs, Jr. | E02F 9/2058 701/2 |
| 2004/0030919 A1* | 2/2004 | Moriya | B60R 25/24 726/35 |

(Continued)

FOREIGN PATENT DOCUMENTS

CH  703922 A1 *  4/2012  ......... B60H 1/00492

OTHER PUBLICATIONS

"Tigercat 610C DW: The mountain skidder", published on Nov. 19, 2013, https://www.tigercat.com/tigercat-610c-dw-the-mountain-skidder/, 3 pages.

(Continued)

*Primary Examiner* — Krishnan Ramesh
(74) *Attorney, Agent, or Firm* — Joseph R. Kelly; Kelly, Holt & Christenson PLLC

(57) ABSTRACT

A gateway interface controller for a work machine includes a CAN bus interface component configured to communicate over a CAN bus of the work machine. The gateway interface controller includes message logic configured to process a request signal, indicative of a requested work machine action, that is received from a remote control, wherein the message logic validates the request signal based on a validation criterion. The gateway interface controller includes command generator logic configured to, based on the validation, generate a CAN signal that corresponds to the request signal and communicate the CAN signal over the CAN bus.

16 Claims, 5 Drawing Sheets

(56) References Cited

U.S. PATENT DOCUMENTS

| | | | |
|---|---|---|---|
| 2005/0034915 A1* | 2/2005 | Kumazawa | B66C 13/56 |
| | | | 180/331 |
| 2009/0125196 A1* | 5/2009 | Velazquez | B66C 23/905 |
| | | | 701/50 |
| 2010/0106344 A1 | 4/2010 | Edwards et al. | |
| 2011/0112729 A1* | 5/2011 | Martin | A01B 69/008 |
| | | | 701/50 |
| 2011/0215639 A1* | 9/2011 | Kurosaki | H04B 10/802 |
| | | | 307/9.1 |
| 2012/0041635 A1* | 2/2012 | Johnson | G06F 11/3013 |
| | | | 701/31.4 |
| 2016/0076893 A1* | 3/2016 | Wei | G05D 1/0214 |
| | | | 701/410 |
| 2017/0123414 A1* | 5/2017 | Gray | E02F 9/207 |
| 2017/0356167 A1* | 12/2017 | Paul | B25J 15/0028 |
| 2018/0106709 A1* | 4/2018 | Cherney | G01N 9/02 |
| 2018/0145508 A1* | 5/2018 | Chan | H02H 7/22 |
| 2018/0171590 A1* | 6/2018 | Kean | E02F 9/205 |
| 2019/0143794 A1* | 5/2019 | Ligi, Jr. | B60H 1/00742 |
| | | | 454/75 |

OTHER PUBLICATIONS

"Tigercat 610C mountain", published on Dec. 9, 2013, https://www.youtube.com/watch?v=37cqsTB3dg8&feature=youtu.be&t=38.

\* cited by examiner

GATEWAY INTERFACE FOR A WORK MACHINE

FIELD OF THE DESCRIPTION

The present disclosure generally relates to the control of a work machine. More specifically, but not by limitation, the present disclosure relates to remote control of a work machine using a gateway interface controller.

BACKGROUND

There are a wide variety of different types of equipment, such as forestry equipment, construction equipment, and agricultural equipment. These types of equipment are often operated by an operator and have sensors that generate information during an operation. These types of equipment can often communicate with other systems or accessories.

For example, forestry equipment can include a wide variety of work machines such as harvesters, skidders, feller bunchers, forwarders, and swing machines, among others. Forestry equipment can have many different mechanisms that are controlled by the operator. The equipment may have multiple different mechanical, electrical, hydraulic, pneumatic, electromechanical (and other) subsystems, some or all of which can be remotely controlled, at least to some extent. Some or all of these subsystems communicate information that is obtained from sensors on the machine (and from other inputs).

The discussion above is merely provided for general background information and is not intended to be used as an aid in determining the scope of the claimed subject matter.

SUMMARY

A gateway interface controller for a work machine includes a CAN bus interface component configured to communicate over a CAN bus of the work machine. The gateway interface controller includes message logic configured to process a request signal, indicative of a requested work machine action, that is received from a remote control, wherein the message logic validates the request signal based on a validation criterion. The gateway interface controller includes command generator logic configured to, based on the validation, generate a CAN signal that corresponds to the request signal and communicate the CAN signal over the CAN bus.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
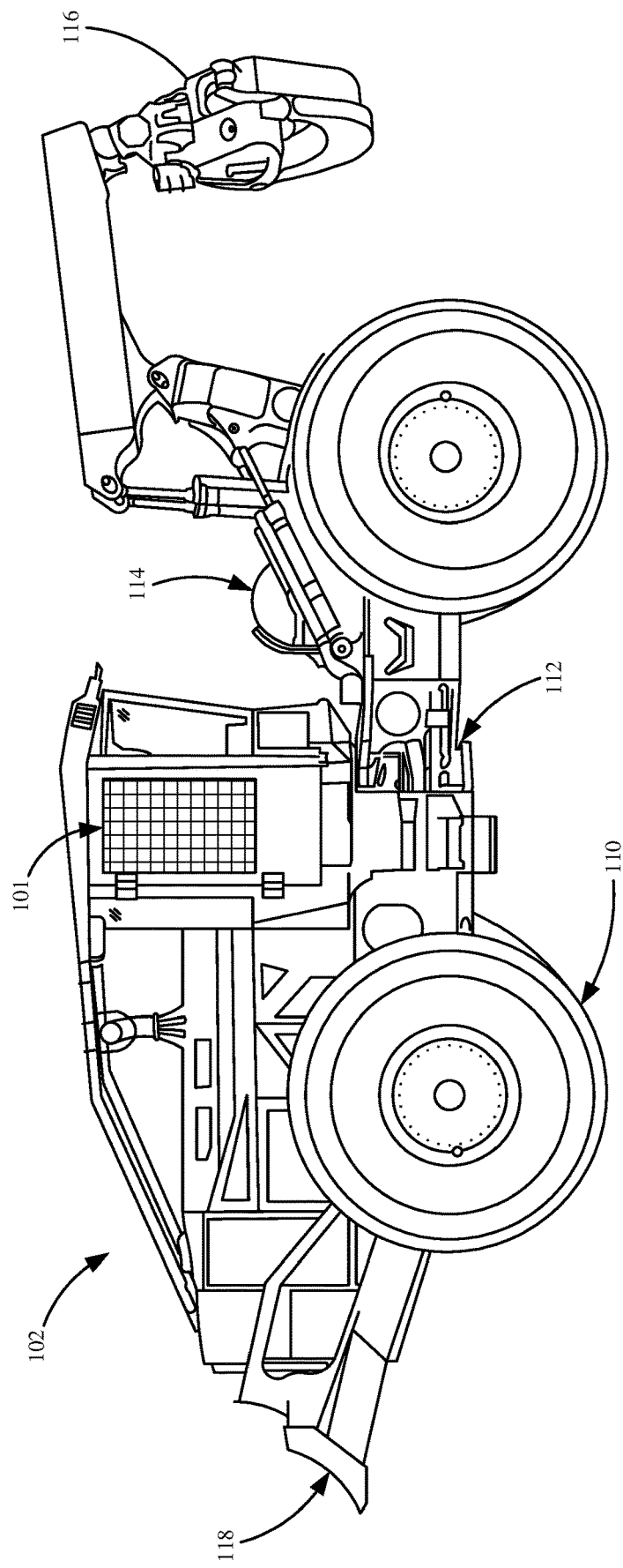
FIG. 1 is a side view of an example work machine.

A wide variety of different work operations can be performed at a jobsite. Some example work operations at a forestry jobsite include, but are not limited to, harvesting a planted material, cutting the stems of the harvested material, removing the branches from the harvested material, sorting the harvested material into piles, and loading the piles onto a hauling truck. Many such forestry operations utilize machinery that can perform a variety of functions.

Work machines (such as a mobile machine, or a vehicle) often have a wide variety of sensors that sense a variety of different variables such as machine operating parameters, worksite characteristics, environmental parameters, etc. In one example, sensor signals are communicated over a controller area network (CAN) bus (or another network, such as an Ethernet network, WiFi etc.) to various systems on the machine that process the sensed variables to generate output signals (such as control signals or other outputs) based on the sensed variables. Work machines also often have a wide variety of controllable subsystems that are capable of performing various operations. These subsystems are actuated by receiving command signals communicated over the CAN bus.

Often original equipment manufacturers (OEM) and third-parties develop accessories that interface with work machines. These accessories can sometimes require access to the CAN bus of the work machine, for example, to retrieve sensor data or control a machine subsystem. In some instances, when an aftermarket or third-party accessory is attached, it is manually hardwired into the CAN bus. Splicing into the CAN bus wiring, adding components to trick the systems attached to the CAN, and/or adding messages manually to the CAN bus, can be problematic because an accessory may negatively affect the CAN bus and other components attached thereto. For example, the accessory could send a signal that overrides safety protocols or a signal that harms the CAN bus. Further, hardwiring into a CAN bus can cause physical damage to the CAN bus.

One type of accessory that is very commonly attached to a work machine is a remote controller. Current remote controllers connect to a machine and can immediately began controlling the machine. This can be problematic or unsafe. For example, sending a remote could send a command that conflicted with a command given by an operator in the operating cab or a button on the remote could accidentally be actuated.

In accordance with one example, to prevent an accessory from causing an unwanted problem, a gateway interface controller is provided. The gateway interface controller interacts with a work machine accessory and isolates the accessory from directly accessing the CAN bus. Predefined messages or signals can be provided for communication of commands and information between the gateway and accessory. The gateway interface controller can include a processor and logic that filters valid signals from invalid signals, between the accessory and CAN bus. Valid signals will be re-broadcast onto the CAN bus while invalid signals will be ignored and not re-broadcast onto the CAN bus. This way any invalid or potentially damaging signals will be prevented from being communicated on the CAN bus. The gateway interface controller can also protect proprietary or other sensitive information from being extracted off the CAN bus by an attached accessory.

In addition to rebroadcasting of CAN messages, the gateway controller can provide preconfigured inputs for use by the accessory. These inputs can connect to the gateway controller using a wired (e.g. an electrical plug) or wireless interface. The gateway can send the status of these inputs to the accessory. This allows the accessory to add components, such as switches or sensors, to a work machine without having to route wires to their controller or by using any of the machine electrical systems.

Further, a remote controller can be communicatively coupled to the machine through the gateway interface controller. When a remote controller attempts to control the work machine a verification process can be completed before the remote controller is able to control the work machine. For instance, the remote controller can first request to be in a non-active control mode. That is, a mode where the remote controller is communicatively coupled to the gateway controller, but any control command sent by the remote controller is not rebroadcast on the machine CAN bus and, hence, is not executed. The non-active control mode can act as a safety mechanism to prevent an unwanted or unsafe command from being executed by the work machine. After the remote controller is put into a non-active control mode, the remote then can request to be in an active control mode. That is, a mode where valid control commands sent by the remote controller to the gateway interface controller, are rebroadcast on the CAN bus and executed by the work machine.

Further, an example interaction between a gateway interface controller with an accessory includes the gateway controller receiving a command message from the accessory and determining the message is valid. The gateway controller then rebroadcasts a corresponding signal onto a machine CAN bus (e.g. a control signal to move an actuator or a request for information). The machine reads these messages, determines the appropriate response, and send the status back to the gateway. The gateway then sends the vehicle status to the aftermarket accessory.

FIG. 1 is a side view of an example work machine 102, in the form of a skidder. It is noted that while present examples are described in the context of a skidder in a forestry application/jobsite, the present systems, components and methods can be utilized in other types of work machines and applications.

Skidder 102 has an operator compartment 101 where an operator is located while operating skidder 102. Skidder 102 has several controllable subsystems that accomplish different functions. These controllable subsystems include propulsion system 110, steering system 112, winch system 114, grapple system 116 and blade system 118. Of course, work machine 102 can comprise other controllable subsystems as well.

Propulsion system 110 propels machine 102 in a forward or rearward direction. As shown, propulsion system 110 includes wheels, however, propulsion system can include tracks (rigid or flexible) or other ground engaging elements, as well. Steering system 112 allows work machine 102 to change a direction of movement. As shown, steering system 112 includes an articulated steering system, however, steering system 112 may include other steering systems as well. Winch system 114 includes a spool and cable to move machine 102 or another object. Winch system 114 can be synchronized with an articulated steering system 112 to align the winch spool perpendicularly with the object it is winching.

Grapple system 116, as shown, includes a grapple and a boom capable of lifting and/or dragging a variety of different objects (e.g., logs). Blade system 118 includes a blade capable of pushing an aggregate. In some cases, a blade system 118 can be lowered to increase machine 102 stability while operating winch system 114.

Figure 2:
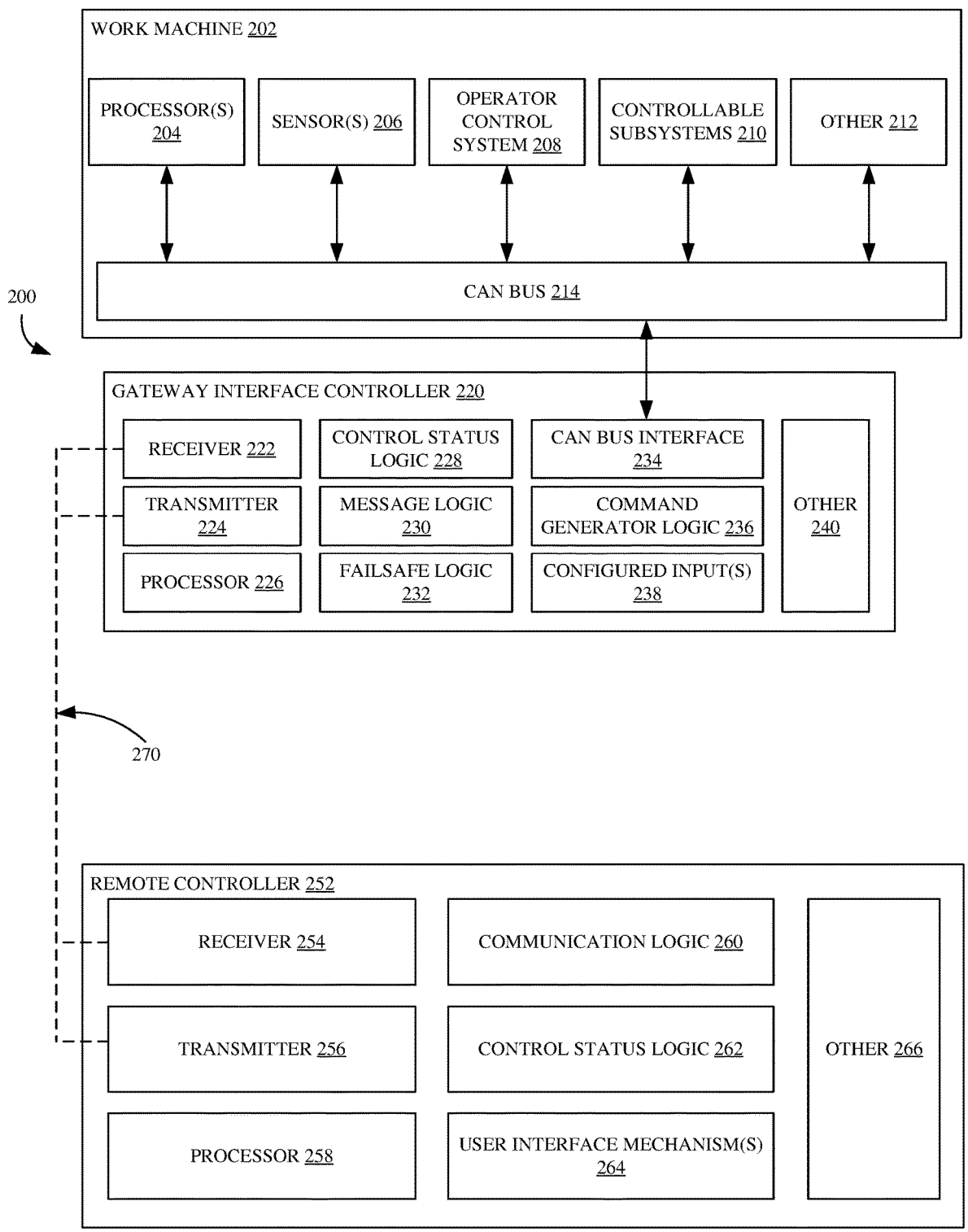
FIG. 2 is a block diagram of an example control system of a work machine.

FIG. 2 is a block diagram of an example control architecture 200 for a work machine 202, such as machine 102 shown in FIG. 1. Control architecture 200 comprises work machine 202, gateway interface controller 220, and remote controller 252. Before describing these components in further detail, an overview of machine 202 will be provided.

Work machine 202 includes CAN bus 214 that is communicatively coupled (directly or indirectly) to many components of work machine 202. Work machine 202 includes one or more processor(s) 204. As shown, there are one or more sensor(s) 206 coupled to CAN bus 214. Some examples of sensor(s) 206 include odometers, hall effect sensors, strain gauges, global positioning systems (GPS), potentiometers, etc. Machine 202 can include operator control system 208 that an operator utilizes to control machine 202. Operator control system 208 can include user interface mechanisms for an operator in/on machine 202 to interact with machine 202. Some examples of user interface mechanisms include displays, haptic devices, audio devices, levers, pedals, steering wheels, etc. Machine 202 can include a variety of different controllable subsystem(s) 210. Some examples of controllable subsystems are propulsion system 110, steering system 112, winch system 114, grapple system 116 and blade system 118, which are have been described in greater detail above, with respect to FIG. 1. Work machine 202 can include other components as well, as indicated by block 212.

Gateway interface controller 220 is also communicatively coupled to CAN bus 214 through CAN bus interface 234. In one example, CAN bus interface 234 includes a mechanism that removably couples to corresponding mechanism on CAN bus 214 (e.g. a plug and socket connection or terminal connection). Configured inputs 238 allow additional components to be attached to gateway interface controller 220 that can either interact with work machine 202 or remote controller 252. For example, switches or sensors can be physically coupled to configured inputs 238 and their status/value can be sent to remote controller 252.

Gateway interface controller 220 includes processor(s) 226 that execute the functions of variety of different logic components. The functions of logic components of gateway interface controller 220 are described in further detail with respect to FIG. 3. Briefly, control status logic 228 sets a control status of the remote controller 252. Message logic 230 processes signals from, and generates signals to remote controller 252. Failsafe logic 232 checks for certain conditions and based on those conditions sets the control status of the remote controller 252 to an inactive mode (failsafe mode). Command generator logic 236 generates CAN signals that can be communicated over CAN bus 214 (using CAN bus interface 234) to components of work machine 202. As discussed in further detail below, the logic components of gateway interface controller 220 are configured to isolate remote controller 252 from CAN bus 214. Illustratively, isolating remote controller 252 from CAN bus 214 means a signal from remote controller 252 will not be communicated across CAN bus 214 without being checked for validity by gateway interface controller 220.

Figure 4:
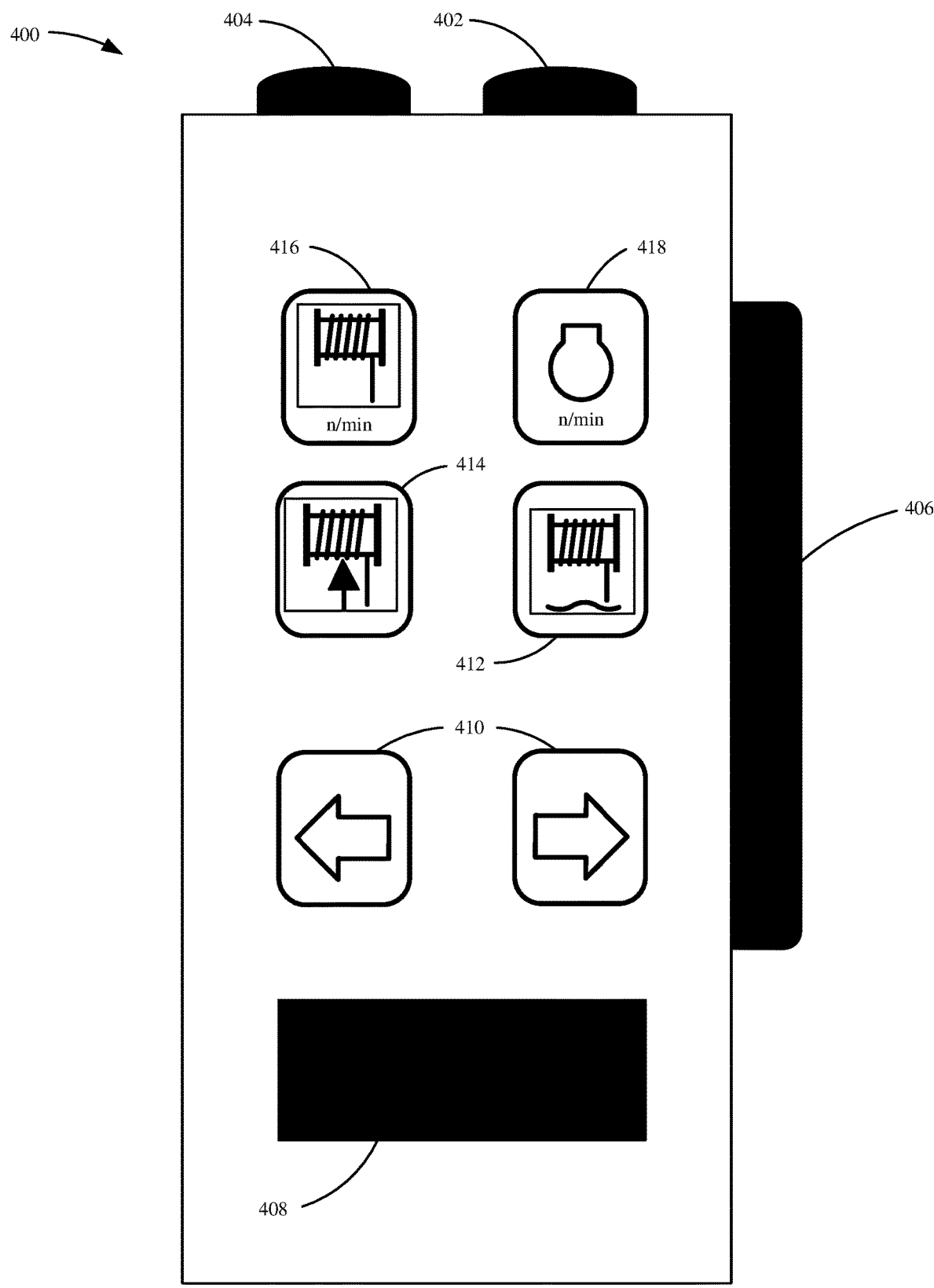
FIG. 4 is a schematic diagram of an example remote control for a work machine.

Remote controller 252 includes a transmitter 256 and receiver 254 that communicate with transmitter 224 and receiver 222 of gateway interface controller 220. This communication is illustrated by connection 270. Connection 270 can be a wired (such as, but not limited to, a second CAN bus) or wireless connection. Some examples of wireless connections include WiFi, Bluetooth, radiofrequency, etc. Remote controller 252 also illustratively includes a processor 258 that executes functions of communication logic 260 and control status logic 262. Communication logic 260 generates signals to and processes signals from gateway interface controller 220. Control status logic 262 generates indications of the current control status to a user of remote controller 252. Remote controller 252 illustratively includes user interface mechanism(s) 264. User interface mechanism(s) can include buttons, haptic devices, audio devices, etc. Some examples of user interface mechanism(s) are shown in FIG. 4. Remote controller 252 can include other items as well, as indicated by block 266.

Figure 3:
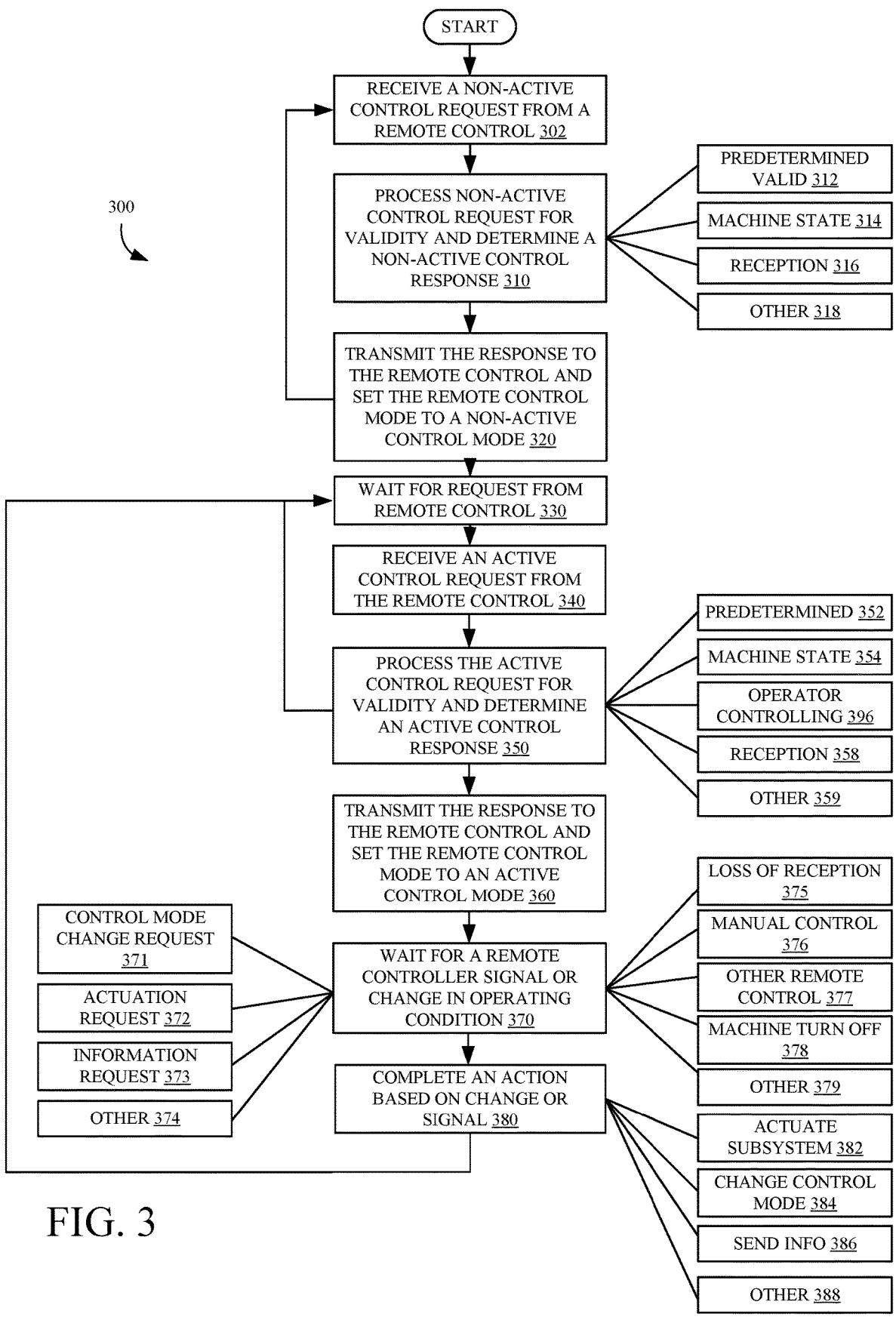
FIG. 3 is a flow chart showing an example method of remotely controlling a work machine.

FIG. 3 is a flow chart showing an example method 300 of remotely controlling a work machine. Method 300 begins at block 302 where gateway interface controller 220 receives a non-active control request from remote controller 252. This non-active control request is indicative of remote controller 252 requesting to be put in a non-active control mode. Illustratively, the non-active control mode comprises a mode where remote controller 252 is connected to gateway interface controller 220, but any machine control command generated by remote controller 252 is ignored, in terms of actuation/execution on machine 102, by gateway interface controller 220 and is not executed by work machine 202.

At block 310, the non-active control request from remote controller 252 is processed for validity by message logic 230, based on at least one validation criterion. A validation criterion can include the non-active control request corresponding to one of plurality of predetermined requests, as indicated by block 312. For example, a request may be compared to a list of predetermined valid requests. A validation criterion can also include the machine being in a proper state, as indicated by block 314. A machine state can be indicative of a variety of different things. For example, a machine state can be indicative of the machine being manually controlled by an operator in operating compartment 101.

After the non-active control request is validated, message logic 230 generates a response to the non-active control request. The response is indicative of granting or denying the non-active control request. A response can also include justification information, indicative of the reason the non-active control request was denied or granted. For example, justification information may indicate the non-active control request was denied because it was in an improper format that did not correspond to one of a plurality predetermined requests.

At block 320, control status logic 228 sets the control mode to a non-active control mode and transmitter 224 transmits the non-active control response to the remote controller 252.

At block 330, gateway interface controller 220 waits for additional requests from remote controller 252. During this time, there may be intermittent communication between remote controller 252 and gateway interface controller 220, for example, to monitor the quality or reception of connection 270.

At block 340, gateway interface controller 220 receives an active control request from remote controller 252. This active control request is indicative of remote requesting to be in an active control mode. Illustratively, an active control mode is a mode where remote controller 252 is connected and remote controller 252 is able to send machine control commands that, if valid, are re-broadcast onto CAN bus 214 and can be executed by work machine 202.

At block 350, the active control request from remote controller 252 is processed for validity by message logic 230 based on one or more validity criterion. The validation criterion can represent a plurality of predefined requests, and validating the active control request includes determining that the active control request corresponds to one of plurality of predetermined requests, as indicated by block 352. For example, predetermined requests can be in a specific signal format. Validity criteria can also include the machine being in a proper machine state, as indicated by block 354. For example, a machine state may be indicative of an operator in operating cab 101 or the machine 202 being in a low power state.

After the active control request is validated, message logic 230 generates an active control response to the active control request. The response is indicative of granting or denying the active control request. A response can also include justification information indicative of the reason the active control request was denied or granted. For example, justification information may indicate the active control request was denied because it was determined an operator is in manual control of machine 202.

At block 360, transmitter 224 transmits the active control response to the remote controller 252.

At block 370, gateway interface controller 220 waits for additional messages or changes in operating condition. Some examples of messages are indicated by blocks 371-374. A message can be indicative of a request for the remote controller 252 to be put in a different control mode, as indicated by block 371. For example, remote controller 252 request to be in a non-active control mode. A message can be indicative of a request for an actuation of a controllable subsystem 210, as indicated by block 372. For example, a request for an actuation of a controllable subsystem 210 could be retracting of winch system 114 or free spooling of winch system 114. A message can be indicative of a request for machine information, as indicated by block 373. For example, remote controller 252 can request the current RPMs of an engine on work machine 202. (Gateway interface controller 220 can retrieve information from other components on CAN bus 214 and relay it to remote controller 252.) A message can include other requests or information as well, as indicated by block 374.

Some examples of changes in operating conditions are indicated by blocks 375-379. A change in operating condition can be a loss of reception or connection between gateway interface controller 220 and remote controller 252, as indicated by block 375. A change in operating condition can be an operator in operator compartment 101 manually controlling machine 202, as indicated by block 376. A change in operating conditions can be another remote control connecting to machine 202, as indicated by block 377. Changes in operating conditions can be work machine 202 powering down, deactivating, turning off, etc., as indicated by block 378. There may be other changes in operating conditions as well, as indicated by block 379.

At block 380, gateway interface controller 220 completes an action. An action can include actuating one or more of controllable subsystems 210 as indicated by block 382. For example, winch system 114 can be actuated to retract a cable. As another example, steering subsystem 112 can be actuated to turn or articulate a portion of work machine 202. Action can be completed by generating a CAN signal with command generator logic 236.

An action can also include changing the control mode from an active mode to a non-active mode, as indicated by block 384. For example, this action, indicated by block 384, could be taken if the conditions of blocks 375-378 were detected at block 370. Then after the control mode is changed to a nonactive mode, method 300 would continue again at block 330.

An action can include sending information to remote controller 252, as indicated by block 386. For example, gateway interface controller 220 sends a signal to another component of work machine 202 and receives information about the component (e.g. the RPMs of an engine, winch retraction speed, etc.) which is then sent to remote controller 252. An action can comprise other things as well, as indicated by block 388.

FIG. 4 is a schematic diagram of an example remote controller 400 for a work machine. Remote control 400 includes a variety of different user interface mechanisms, represented by reference numbers 402-418. These mechanisms, as shown, are buttons. However, in other examples they can be other types of user interface mechanisms as well. For example, displays, touchscreens, switches, etc.

Remote control 400 is powered on or off by power button 402. To request a control mode, change control mode button 404 is pressed. For example, a user can first press button 404 to request to be in a non-active control mode. When the remote control 400 gets a response to the request, an indication of the current control mode can be displayed on display 408. Then the user can press button 404 again to request to be in an active control and again an indication of the response will be displayed on display 408.

Mechanism 408 is a display that can display messages to a user of remote control 400. Display 408 can include a user interface and/or a touch screen. Display 408 can show current machine settings, for example, winch retract speed, engine speed (RPM), current control mode, etc. Buttons 410 can control the steering system 112 of machine 202. In an articulated steering system, this can align a winch system 114 to an object operably coupled to the winch. Button 412 is a winch out button. Winch out can be automatic (driving the winch drum in reverse) or manual (free spool of the winch drum). Actuating button 414 drives the winch drum in a direction to retract the winch at a given speed. This given winch speed can be set by using button 460. Button 418 allows a user to change the engine speed. In other examples, remote 400 includes other user interface mechanisms as well. In one example, as a safety measure, activation button 406 must be depressed before mechanisms 410-418 can be actuated.

Figure 5:
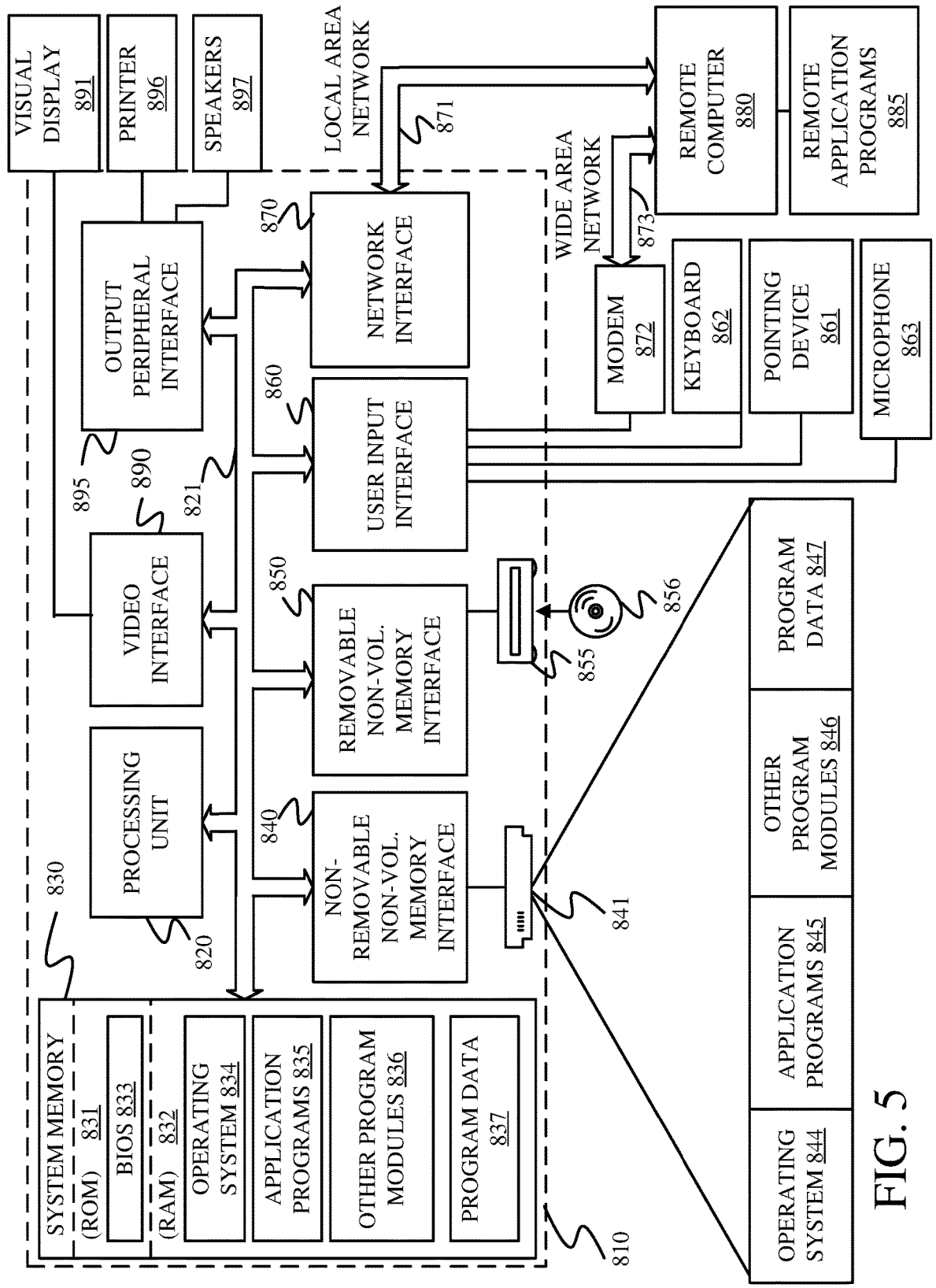
FIG. 5 is a block diagram showing one example of a computing environment that can be used in the work machine and/or in the architectures shown in the previous figures.

FIG. 5 is one example of a computing environment in which elements of FIG. 2, or parts of it, (for example) can be deployed. With reference to FIG. 5, an example system for implementing some examples includes a general-purpose computing device in the form of a computer 810. Components of computer 810 may include, but are not limited to, a processing unit 820 (which can comprise processor 226), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 5.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 5 illustrates operating system 834, application programs 835, other program modules 836, and program data 837.

The computer 810 may also include other removable/non-removable volatile/nonvolatile computer storage media. By way of example only, FIG. 5 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 810. In FIG. 5, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 5 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a gateway interface controller for a work machine, the gateway interface controller comprising:
  a CAN bus interface component configured to communicate over a CAN bus of the work machine;
  message logic configured to process a request signal, indicative of a requested work machine action, that is received from the remote control, wherein the message logic validates the request signal based on a validation criterion; and
  command generator logic configured to:
    based on the validation, generate a CAN signal that corresponds to the request signal; and
    communicate the CAN signal over the CAN bus.

Example 2 is the gateway interface controller of any or all previous examples, wherein the validation criterion comprises a control mode status.

Example 3 is the gateway interface controller of any or all previous examples, further comprising:
  control status logic configured to set the control mode status, based on an operational characteristic of the work machine.

Example 4 is the gateway interface controller of any or all previous examples, wherein the control status logic is configured to:
  prior to setting the control status of the remote control to an active control status, set the control status of the remote control to a non-active control status, indicative of all receive signals being invalid.

Example 5 is the gateway interface controller of any or all previous examples, further comprising:
  failsafe logic configured to set the control status to a non-active control status, indicative of all received signals being invalid, if a non-active control condition is detected.

Example 6 is the gateway interface controller of any or all previous examples, wherein the non-active control condition is indicative of a signal loss between the remote control and gateway interface controller.

Example 7 is the gateway interface controller of any or all previous examples, wherein the non-active control condition is indicative of an operator controlling the machine from a cab of the work machine.

Example 8 is the gateway interface controller of any or all previous examples, wherein the corresponding CAN signal comprises a winch control signal indicative of a winch actuation.

Example 9 is the gateway interface controller of any or all previous examples, wherein the validation criterion is indicative of a predefined valid request signal, and the message logic is configured to validate the request signal, if the request signal corresponds to the predefined valid request signal.

Example 10 is a work machine comprising:
  a machine CAN bus;
  a controllable subsystem communicatively coupled to the machine CAN bus; and
  a gateway interface controller comprising:
    a CAN bus interface configured to communicatively couple to the machine CAN bus;
    message logic configured to receive a signal associated with a remote control and generate a validity indication, based on whether the received signal corresponds to one of a plurality of valid signals; and
    command generator logic configured to generate a CAN signal based on the validity indication and communicate the CAN signal across the machine CAN bus using the CAN bus interface.

Example 11 is the work machine of any or all previous examples, wherein the gateway interface controller comprises:
  a transmitter and receiver configured to communicate with the remote control.

Example 12 is the work machine of any or all previous examples, wherein the gateway interface controller comprises:
  a preconfigured input configured to receive and power a third-party component; and
  wherein the message logic is configured to send values generated by the third-party component to the remote control.

Example 13 is the work machine of any or all previous examples, wherein the CAN bus interface comprises:
  a coupling mechanism configured to removably couple to a corresponding mechanism of the machine CAN bus.

Example 14 is the work machine of any or all previous examples, wherein the gateway interface controller is configured to process all signals sent by the remote control to the work machine.

Example 15 is the work machine of any or all previous examples, wherein the CAN bus signals are indicative of an actuation of the controllable subsystem.

Example 16 is the work machine of any or all previous examples, wherein the work machine comprises a skidder.

Example 17 is the work machine of any or all previous examples, wherein the controllable subsystem comprises a winch.

Example 18 is a method for remotely controlling a work machine, the method comprising:
  receiving, with a receiver of a gateway interface controller, a non-active control request from a remote control;

generating, with message logic, a non-active control response, based on the non-active control request;

sending, with a transmitter of the gateway interface controller, the non-active control response to the remote control;

after sending the non-active control response, receiving, with the receiver, the control signal command from the remote control; and relaying, with a CAN bus interface of the gateway interface controller, the control signal across a CAN bus of the work machine to a controllable subsystem of the work machine.

Example 19 is the method for remotely controlling the work machine of any or all previous examples, further comprising:

receiving, with the receiver, prior to receiving a control signal command, an active control request from the remote control;

generating, with the message logic, an active control response based on a machine operating status and the active control request;

sending, with the transmitter, the active control response to the remote control; and wherein relaying the control signal across the CAN bus is based on the active control response.

Example 20 is the method for remotely controlling the work machine of any or all previous examples, wherein the machine operating status is indicative of an operator controlling the machine from a cab of the machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A gateway interface controller for a work machine, the gateway interface controller comprising:
   a CAN bus interface component configured to communicate over a CAN bus of the work machine;
   a preconfigured input port configured to connect to and power a third-party component, different than a remote control;
   message logic configured to:
      receive a request signal from the remote control, the request signal indicative of a requested work machine action, wherein the message logic is configured to isolate the request signal from the CAN bus;
      validate the request signal based on a validation criterion; and
      send values generated by the third-party component to the remote control; and
   command generator logic configured to:
   based on the validation, generate a CAN signal that corresponds to the request signal and communicate the CAN signal over the CAN bus.

2. The gateway interface controller of claim 1, wherein the validation criterion comprises a control mode status.

3. The gateway interface controller of claim 2, further comprising:
   control status logic configured to set the control mode status, based on an operational characteristic of the work machine.

4. The gateway interface controller of claim 3, wherein the control status logic is configured to:

prior to setting the control status of the remote control to an active control status, set the control status of the remote control to a non-active control status, indicative of all receive signals being invalid.

5. The gateway interface controller of claim 2, further comprising:
   failsafe logic configured to set the control status to a non-active control status, indicative of all received signals being invalid, if a non-active control condition is detected.

6. The gateway interface controller of claim 5, wherein the non-active control condition is indicative of a signal loss between the remote control and gateway interface controller.

7. The gateway interface controller of claim 5, wherein the non-active control condition is indicative of an operator controlling the machine from a cab of the work machine.

8. The gateway interface controller of claim 1, wherein the corresponding CAN signal comprises a winch control signal indicative of a winch actuation.

9. The gateway interface controller of claim 1, wherein the validation criterion is indicative of a predefined valid request signal, and the message logic is configured to validate the request signal, if the request signal corresponds to the predefined valid request signal.

10. A work machine comprising:
    a machine CAN bus;
    a controllable subsystem communicatively coupled to the machine CAN bus; and
    a gateway interface controller comprising:
       a CAN bus interface configured to communicatively couple to the machine CAN bus;
       a preconfigured input configured to receive and power a third-party component;
       message logic configured to:
          receive a signal associated with a remote control;
          send values generated by the third-party component to the remote control;
          determine that a cab of the work machine is empty of an operator; and
          generate a validity indication, the validity indication being indicative of the cab of the work machine being empty of the operator; and
       command generator logic configured to generate a CAN signal and communicate the CAN signal across the machine CAN bus using the CAN bus interface, based on the validity indication indicative of the cab of the work machine being empty of the operator.

11. The work machine of claim 10, wherein the gateway interface controller comprises:
    a transmitter and receiver configured to communicate with the remote control.

12. The work machine of claim 10, wherein the CAN bus interface comprises:
    a coupling mechanism configured to removably couple to a corresponding mechanism of the machine CAN bus.

13. The work machine of claim 10, wherein the gateway interface controller is configured to process all signals sent by the remote control to the work machine.

14. The work machine of claim 10, wherein the CAN bus signals are indicative of an actuation of the controllable subsystem.

15. The work machine of claim 10, wherein the work machine comprises a skidder.

16. The work machine of claim 15, wherein the controllable subsystem comprises a winch.

* * * * *